United States Patent
Stehl

[15] 3,664,967
[45] May 23, 1972

[54] PELLICULAR COLUMN PACKING FOR LIQUID CHROMATOGRAPHY

[72] Inventor: Rudolph H. Stehl, Midland, Mich.

[73] Assignee: The Dow Chemical Company, Midland, Mich.

[22] Filed: Feb. 11, 1970

[21] Appl. No.: 10,617

[52] U.S. Cl. ...................252/431 R, 252/426, 260/448, 260/448.2, 210/31
[51] Int. Cl. ...................................................B01d 15/08
[58] Field of Search ..................252/426, 429, 430, 431; 260/448, 448.2

[56] References Cited

UNITED STATES PATENTS

| 3,346,349 | 10/1967 | Harding et al. | 260/448.2 X |
| 3,116,161 | 12/1963 | Purnell | 260/448.2 X |
| 3,207,699 | 9/1965 | Harding et al. | 252/431 X |
| 3,213,156 | 10/1965 | Harding et al. | 252/426 X |
| 3,484,371 | 12/1969 | Biegler et al. | 252/430 X |
| 3,389,092 | 6/1968 | Sanford et al. | 252/430 |

*Primary Examiner*—Patrick P. Garvin
*Attorney*—Griswold and Burdick, Glwynn R. Baker and C. E. Rehberg

[57] ABSTRACT

A halogenated organo silica gel or halogenated organo alumina prepared by reacting an organo halosilane with a silica gel or alumina gel of high relative surface area, then reacting the so-produced product with a halogen.

7 Claims, No Drawings

PELLICULAR COLUMN PACKING FOR LIQUID CHROMATOGRAPHY

BRIEF DESCRIPTION OF INVENTION

In accordance with the present invention, a silica gel or alumina gel having a high relative surface area, e.g., 10 to 600 square meters per gram, is reacted with either a high molecular weight organo halosilane, e.g., a $C_{12}$–$C_{28}$ mono-, di- or trihalosilane or a vinyl halosilane which vinyl group is later modified to a high molecular weight organo moiety, the halogen atom of which may be further reacted with alcohols to improve the organic nature of the pellicule or surface. The resulting product is then halogenated to provide from about 0.1 to about 5 percent halogen based on the total weight. Good results are obtained when the organic nature of the surface represents from about 0.1 to 20 percent based on the total weight.

DETAILED DESCRIPTION OF INVENTION

The products of the present invention are conveniently prepared by 1. reacting at room temperature a $C_{12}$ to $C_{28}$ organo halosilane, preferably a $C_{16}$ to $C_{20}$ alkyl trichlorosilane with a silica gel having a surface area of from about 10 to about 600 square meters per gram, preferably from about 200 to 400 square meters per gram. The reaction is carried out by contacting the silica gel as a slurry with the silane in an inert organic solvent for the silane, e.g., hexane. The reaction proceeds readily to substantial completion under a slight vacuum, e.g., 50 Torr, in 3 to 6 hours. The proportion of organo halosilane which reacts with the silica gel is controlled by the amount of silane contacted with the gel. Upon completion of the reaction, the product is filtered, washed with solvent, hexane, and dried under vacuum.

2. To further increase the hydrocarbon or organo nature of the surface, the product may be reacted with a $C_6$ to $C_{28}$ alcohol under similar conditions as set forth above. The reaction is again complete in 3 to 6 hours at room temperature. The further reacted product is filtered, washed and again dried under vacuum, e.g., 0.1 Torr.

3. The so resulting product is then halogenated by contacting the halogen in a solvent with a slurry of the product in the presence of photochemical activation, e.g., ultraviolet light, for 6 to 12 hours. Upon completion of the halogenation, the now halogenated organo silica or halogenated organo silica alumina is filtered, washed and dried under vacuum as before.

In a somewhat similar manner, one can employ a vinyl halosilane in place of the high molecular weight silane of step one above, then further react or modify the vinyl moiety by well-known techniques to increase the organo nature of the product moiety. For example, the vinyl moiety may be hydrolyzed, then reacted with long chain alkyl ($C_8$ to $C_{28}$) halides, sulfides or thiocyanates. The resulting product is then treated in the same manner as before in steps two and three.

The following examples illustrate the invention but are not to be construed as limiting:

EXAMPLE 1

Approximately 10 grams of a 200/325 mesh (ASM) silica gel (produced by Merck and Company and sold under the trade name Merck Silica Gel H) was slurried with 50 ml. of n-hexane with stirring. To the slurry was added, while stirring, 5 g. of octadecyl trichlorosilane (manufactured by Dow Corning Corporation and sold under the trade name Dow Corning Z 1215 Silane). The reaction was allowed to proceed at room temperature with continued stirring while drawing a vacuum, 50 Torr, for 3 to 6 hours. The resulting slurry was then filtered through a medium porosity glass fritted filter funnel, and washed with hexane. To the solids in the funnel were slurried with hexane, then about 10 ml. of octanol was added with stirring. After setting for about 1.5 hours, a vacuum, 50 Torr, was again drawn and the solids washed with hexane under vacuum and dried under 1 Torr vacuum at room temperature.

The resulting product was then brominated by adding about 5 ml. of liquid bromine to a slurry of the product in hexane while subjecting the stirring mixture to ultraviolet irradiation of 254 nm. for 10 hours. The resulting product was filtered, washed with chloroform and dried under vacuum, 1 Torr, at ca. 25° C.

Chromatographic glass columns 500 × 2.8 mm were packed with the product using vibration and lamping to settle the packing during filling. The so-packed columns were equilibrated in a chromatograph by passing the liquid employed as a carrier through the column. After equilibration, the columns were used to make chromatographic analysis of a commercial grade of 2,4,5-trichlorophenoxyacetic. The results of this analysis showed the presence of about 0.9 mg. of 2,3,7,8-tetrachlorodibenzo-p-dioxin at about 1.7 hours. Using the same column and 2,3,7,8-tetrachlorodibenzo-p-dioxin, the peak appeared at about 1.7 hours.

Comparison with standard materials analyzed similarly permitted the quantitation by comparison of peak heights.

The particulars of the chromatographic separation are: solvent for commercial grade 2,4,5-trichlorophenoxyacetic acid was 15 percent water in ACS grade methanol; the eluant for the column was 50 percent acetonitrile in methanol; the flow rate was 10 percent of pump capacity or 0.3 ml./min.

It is to be understood that substantially any of the relatively non-polar aromatic compounds having molecular weights of about 300 to about 800 can be separated for analysis from mixtures thereof or mixtures with aliphatic hydrocarbons as well as neutral high molecular weight lipids, fatty acid esters and nucleosides.

Thus one can obtain a chromatographic analysis of the chlorodiphenyl oxides, chlorobiphenyls, 2,4-dichlorophenoxyacetic acid, lipids, fatty acid esters and nucleosides.

The packing may be of various mesh size from about 50 to about 600 mesh and preferably from about 200 to 400 mesh.

I CLAIM:

1. A chromatographic column packing consisting essentially of the ambient temperature reaction product of a silica or alumina gel solid having a surface area of from 10 to about 600 square meters per gram and a particle size of from 50 to about 600 mesh, with an organo halo silane having $C_{12}$ to $C_{28}$ hydrocarbon organo moieties and chlorine or bromine halo moieties or with a vinyl halo silane which is hydrolyzed and further reacted with a $C_8$–$C_{28}$ alkyl halide, sulfide or thiocyanate, either of which may be further reacted with a $C_6$–$C_{28}$ alcohol so as to provide from 0.1 to about 20 percent by weight based on the total weight of the solids, or organo halo moieties, said halo moiety being present in from about 0.01 to about 5 percent by weight based on the total weight of the solids, and being obtained by halogenation of the product with chlorine or bromine under photochemical activation.

2. The packing of claim 1 wherein said solid is a silica gel.

3. The packing of claim 2 wherein the product before halogenation has been further reacted with an alcohol having from 6 to 28 carbon atoms.

4. The packing of claim 1 wherein the alcohol is octyl alcohol.

5. The packing of claim 1 wherein the solid is an alumina.

6. A method for preparing the chromatographic packing of claim 1 which consists essentially of: reacting 1. a silica gel having a surface area of from about 10 to about 600 square meters per gram and a size of about 50 to 600 mesh with an organo halosilane having as the organo moiety a vinyl radical or an aliphatic hydrocarbon of 12 to 28 carbon atoms, said reaction being conducted at ambient temperatures and under atmospheric or subatmospheric pressure, 2. hydrolyzing the product of step 1 if the organo moiety is vinyl and further reacting this product with an alkyl halide, sulfide or thiocyanate having 8 to 28 carbon atoms, 3. the resulting product of step 2 or the long chain product of step 1 with a halogen to provide from 0.01 to about 5 percent by weight halogen based on total weight of product.

7. The process of claim 6 wherein said organo moiety is octadecyl, said halogen is bromine and an alcohol of from 6 to 28 carbon atoms is reacted with said organo silica prior to halogenation.

* * * * *

PO-1050
(5/69)

UNITED STATES PATENT OFFICE
CERTIFICATE OF CORRECTION

Patent No. 3,664,967     Dated 23 May 1972

Inventor(s) Rudolph H. Stehl

It is certified that error appears in the above-identified patent and that said Letters Patent are hereby corrected as shown below:

In line 2 of the Abstract, insert --gel-- between the words "-mina" and "prepared".

Column 2, line 48, delete "or" and insert --of--.

Signed and sealed this 10th day of October 1972.

(SEAL)
Attest:

EDWARD M. FLETCHER, JR.
Attesting Officer

ROBERT GOTTSCHALK
Commissioner of Patents